(12) United States Patent
Zerbe

(10) Patent No.: US 6,985,530 B1
(45) Date of Patent: Jan. 10, 2006

(54) INTEGRATED RECEIVER DECODER AND METHOD FOR SIMULTANEOUSLY TRANSMITTING COMPRESSED AND UNCOMPRESSED SIGNALS

(75) Inventor: Nathan B. Zerbe, El Segundo, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 494 days.

(21) Appl. No.: 10/223,965

(22) Filed: Aug. 20, 2002

(51) Int. Cl.
   *H04N 1/66* (2006.01)
(52) U.S. Cl. .............................................. 375/240.29
(58) Field of Classification Search ............... 375/240.01–240.29; 386/46; 380/201, 212; 725/39; H04B 1/66
   See application file for complete search history.

(56) References Cited

U.S. PATENT DOCUMENTS

| 5,231,494 A | | 7/1993 | Wachob |
| 5,774,548 A | * | 6/1998 | Bando et al. ............... 380/212 |
| 6,101,368 A | | 8/2000 | Farnsworth et al. |
| 6,185,360 B1 | * | 2/2001 | Inoue et al. .................. 386/46 |
| 6,351,538 B1 | * | 2/2002 | Uz .............................. 380/201 |
| 2002/0016963 A1 | * | 2/2002 | Inoue et al. .................. 725/39 |

* cited by examiner

Primary Examiner—Tung Vo
(74) Attorney, Agent, or Firm—Georgann S. Grunebach

(57) ABSTRACT

An integrated receiver decoder is provided for allowing simultaneous transmission of compressed and uncompressed signals for an audio/video program. The integrated receiver decoder includes a demodulator for receiving a modulated carrier signal and extracting a baseband signal therefrom. The demodulator transmits the baseband signal to a demultiplexor. The demultiplexor extracts a selected compressed signal from the baseband signal. The demultiplexor then transmits the selected compressed signal to a compression decoder for converting the selected compressed signal into a selected uncompressed signal. The compression decoder then transmits the selected uncompressed signal to a graphics overlay device for blending the selected uncompressed signal with user interface graphics. Thereafter, a digital transport device combines the selected compressed signals with a blended uncompressed signal so as to produce a multiplexed signal for transmission through a universal interface output.

20 Claims, 3 Drawing Sheets

INTEGRATED RECEIVER DECODER AND METHOD FOR SIMULTANEOUSLY TRANSMITTING COMPRESSED AND UNCOMPRESSED SIGNALS

TECHNICAL FIELD

The present invention relates generally to digital signal transmission, and more particularly to an integrated receiver decoder that employs a digital transport device for transmitting both compressed and uncompressed signals of an audio/video program.

BACKGROUND OF THE INVENTION

Digital broadcasters use integrated receiver decoders (IRDs) or set-top boxes for providing subscribers with broadcast services. By way of cable transmission, terrestrial transmission, or satellite transmission, the broadcasters send a modulated carrier signal to the IRDs situated in the subscribers' homes. Each IRD processes the modulated carrier signal and utilizes multiple interfaces to send the signal to the subscriber's television, recording device, or other peripheral device.

Although recent developments in digital signal transmission have produced digital interfaces capable of transmitting relatively large amounts of data, existing IRDs typically use several digital interfaces. The technological advancement allows a single digital interface to have throughput speeds greater than 1 Gbps. However, existing IRDs utilize multiple interfaces each normally transmitting only one type of format. Examples of these formats include compressed audio/video signals and uncompressed audio/video signals. In this respect, an IRD may employ two or more digital interfaces for transmitting compressed and uncompressed signals of an audio/video program.

A drawback of using multiple interfaces is that the digital interfaces congest the space within the housing of the IRD. In view of this, manufacturers carefully arrange the interfaces within the IRD so as to maximize the available space. Arranging the interfaces in this manner may complicate manufacture of IRDs, increase manufacturing cycle time, and increase costs associated therewith. Furthermore, the use of multiple interfaces also hinders the manufacturers from producing smaller-sized devices, which is a goal commonly held by manufacturers. Such adverse results are clearly undesirable.

Another drawback is an overabundance of connections between the IRD and the peripheral devices. For example, an IRD may supply a video input, left audio input, and right audio input for each peripheral device. In this regard, an IRD supplying a broadcast signal to a VCR and a television may have up to six cords extending therefrom. The relatively high number of interconnections may complicate set up of an entertainment system or other systems employing IRDs.

Therefore, it would be desirable to provide an IRD that employs a single digital interface for transmitting compressed and uncompressed signals of an audio/video program through a universal interface output.

SUMMARY OF THE INVENTION

The present invention provides an integrated receiver decoder (IRD) that uses a digital transport device for transmitting compressed and uncompressed signals of an audio/video program.

The IRD includes a demodulator for receiving a modulated carrier signal and extracting a baseband signal therefrom. The demodulator transmits the baseband signal to a demultiplexor for extracting a selected compressed signal therefrom. The demultiplexor then transmits the selected compressed signal to a compression decoder for converting the selected compressed signal into a selected uncompressed signal. The selected uncompressed signal then passes to a graphics overlay device for blending the selected compressed signal with user interface graphics. Thereafter, a digital transport device combines the selected uncompressed signal and the selected compressed signal into a multiplexed signal for transmission through a universal interface output.

One advantage of the present invention is that the combined transmission of compressed and uncompressed signals allows for fewer connections between the IRD and peripheral devices thereby simplifying set up of systems employing IRDs.

Another advantage of the present invention is that the amount of space occupied within IRDs is reduced thereby simplifying manufacture of IRDs, decreasing manufacturing cycle time, and decreasing costs associated therewith.

Yet another advantage of the present invention is that the IRD can transmit compressed signals for audio/video programs thereby maximizing recording time for capacity-limited storage media.

Still another advantage of the present invention is that the IRD can transmit uncompressed signals for audio/video programs and permit display of the broadcast service enhanced with complex user interface graphics.

Yet another advantage of the present invention is that the IRD can enhance video streams with graphics on a pixel by pixel basis thereby enhancing a user interface. This advantage may be accomplished by employing simple to substantially complex graphics engines, depending on the level of graphics capability designed into the IRD.

Still another advantage of the present invention is that the IRD can blend multiple video streams thereby creating a rich viewing experience. In this regard, video graphics engines may combine two or more compression decoded video streams so as to allow for multiple simultaneous display in separate display windows.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE PREFERRED EMBODIMENT

Figure 1:
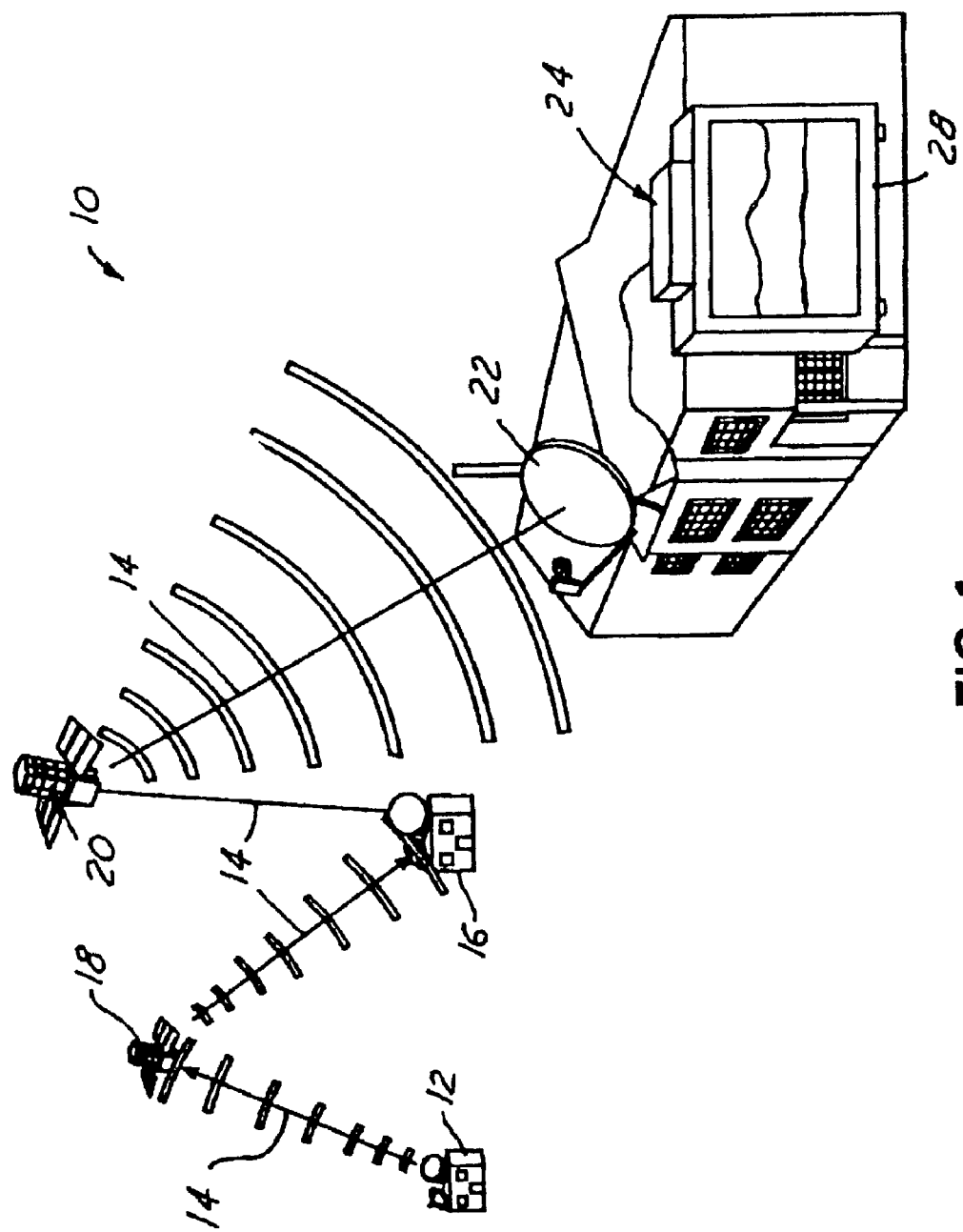
FIG. 1 is a schematic diagram of a digital satellite system employing an integrated receiver decoder, in accordance with a preferred embodiment of the present invention.

In the following figures, the same reference numerals are used to identify the same components in the various views.

Figure 2:
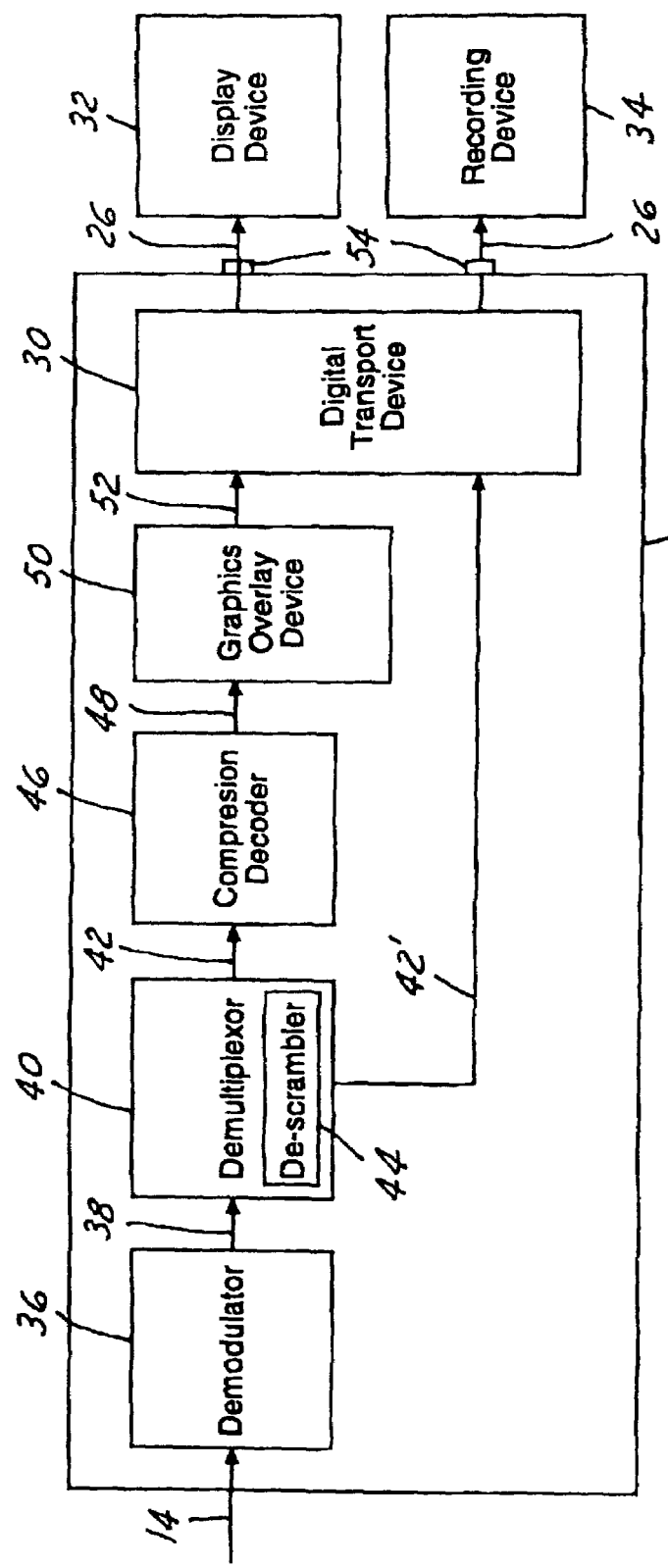
FIG. 2 is a schematic diagram of an integrated receiver decoder employing a digital transport device for transmitting both compressed and uncompressed signals of an audio/video transmission, in accordance with a preferred embodiment of the present invention.

Referring to FIG. 1, there is shown a schematic diagram of digital satellite system (DSS) 10, in accordance with a preferred embodiment of the present invention. The DSS 10 includes a programming source 12 that transmits a modulated carrier signal 14 to a broadcast center 16 by way of a first satellite 18. Thereafter, the broadcast center 16 uses a second satellite 20 for transmitting the modulated carrier signal 14 to a satellite dish 22 situated near a subscriber's building. The satellite dish 22 sends the modulated carrier signal 14 to an integrated receiver decoder (IRD) 24 or set-top box. The IRD 24 processes the modulated carrier signal 14 so as to produce a multiplexed signal 26 (as shown in FIG. 2) of compressed and uncompressed audio/video data. Thereafter, the IRD 24 sends the multiplexed signal 26 to a peripheral device, such as a television 28.

Although FIG. 1 illustrates a DSS 10 using an IRD 24 to provide subscribers with audio/video programming, it is understood that various other systems may employ an IRD 24 in accordance with the present invention.

Referring now to FIG. 2, there is shown a schematic diagram of an IRD 24 for use in a digital broadcasting system, in accordance with a preferred embodiment of the present invention.

In general, the IRD 24 receives a modulated carrier signal 14 from a broadcast center 16 and processes the modulated carrier signal 14 into a multiplexed signal 26. The multiplexed signal 26 is intended for use by a peripheral device, such as a display device 32 or a recording device 34. The multiplexed signal 26 preferably includes both compressed and uncompressed audio/video signals for the same audio/video program.

In particular, the IRD 24 includes a demodulator 36 that receives the modulated carrier signal 14 from the broadcast center 16. As is known in the art, the IRD 24 may receive the modulated carrier signal 14 through various forms of transmission, e.g. satellite, cable, and terrestrial. The demodulator 36 processes the modulated carrier signal 14 and extracts a baseband signal 38 therefrom. The demodulator 36 is coupled to a demultiplexor 40 and transmits the baseband signal 38 to the demultiplexor 40.

The demultiplexor 40 separates the baseband signal 38 into separate compressed signals or channels. Each signal comprises data for individual audio/video programs, in addition to other data services provided by the broadcast center 16. Furthermore, the demultiplexor 40 identifies a selected compressed signal 42, 42' pursuant to the audio/video program or data service chosen by the user. For example, the demultiplexor 40 may identify a selected compressed signal 42, 42' for a particular channel chosen by a user watching television.

The demultiplexor 40 preferably has a de-scrambler 44 integrated therein for decrypting the selected compressed signal 42, 42'. The de-scrambler 44 is typically used for pay-TV services or other restricted channels. On the other hand, where decryption is not required, it is understood that the demultiplexor 40 may not include the de-scrambler 44.

The demultiplexor 40 is coupled to a compression decoder 46 and transmits the selected compressed signal 42 to the compression decoder 46.

The compression decoder 46 converts the selected compressed signal 42 into a selected uncompressed signal 48. As is known in the art, the compression decoder 46 essentially reconstructs the selected compressed signal 42 such that it is near its original form. Preferably, the compression decoder 46 has an MPEG-2 format. However, it is understood that the compression decoder 46 may be capable of processing other suitable standards. Examples of these standards include MPEG-1, MPEG-3, MPEG-4, and MP3. The compression decoder 46 is coupled to a graphics overlay device 50 and transmits the selected uncompressed signal 48 to the graphics overlay device 50 for blending with user interface graphics.

The graphics overlay device 50 blends local user interface graphics with the selected uncompressed signal 48 so as to produce a blended uncompressed signal 52. These graphics may include menu configurations for a channel guide, a movie guide, a message center, a weather forecast, and a variety of other services. The graphics overlay device 50 is preferably coupled to a digital transport device 30 and transmits the blended uncompressed signal 52 thereto.

In addition to receiving the blended uncompressed signal 52 from the graphics overlay device 50, the digital transport device 30 also receives the selected compressed signal 42' from the demultiplexor 40. The digital transport device 30 combines the blended uncompressed signal 52 and the selected compressed signal 42' into a multiplexed signal 26. In this regard, the multiplexed signal 26 includes relatively large amounts of data. Consequently, the digital transport device 30 preferably has a substantially high throughput speed for processing the large amount of data. Specifically, the digital transport device 30 preferably has a throughput speed of approximately 1 Gbps. Of course, digital transport devices 30 having other suitable speeds may be utilized.

The digital transport device 30 preferably includes a universal interface output 54 for connecting to both a display device 32 and a recording device 34. The display device 32 preferably extracts the uncompressed signal from the multiplexed signal 26 and displays the audio/video program for the user. Furthermore, the recording device 34 preferably extracts the compressed signal from the multiplexed signal 26 for efficient storage on a medium. As is known in the art, compressed data occupies less space on capacity-limited media thereby effectively increasing the storage capability of the media.

Each universal interface output 54 serves as connector between the IRD 24 and the respective peripheral device. The universal interface output 54 supplies the peripheral devices with all formats of the desired data associated with a given channel. As a result, the IRD 24 uses less types of connectors and fewer digital transport devices 30 or interfaces than the prior art. Such a result improves manufacture of IRDs and simplifies set up of systems having IRDs 24.

Figure 3:
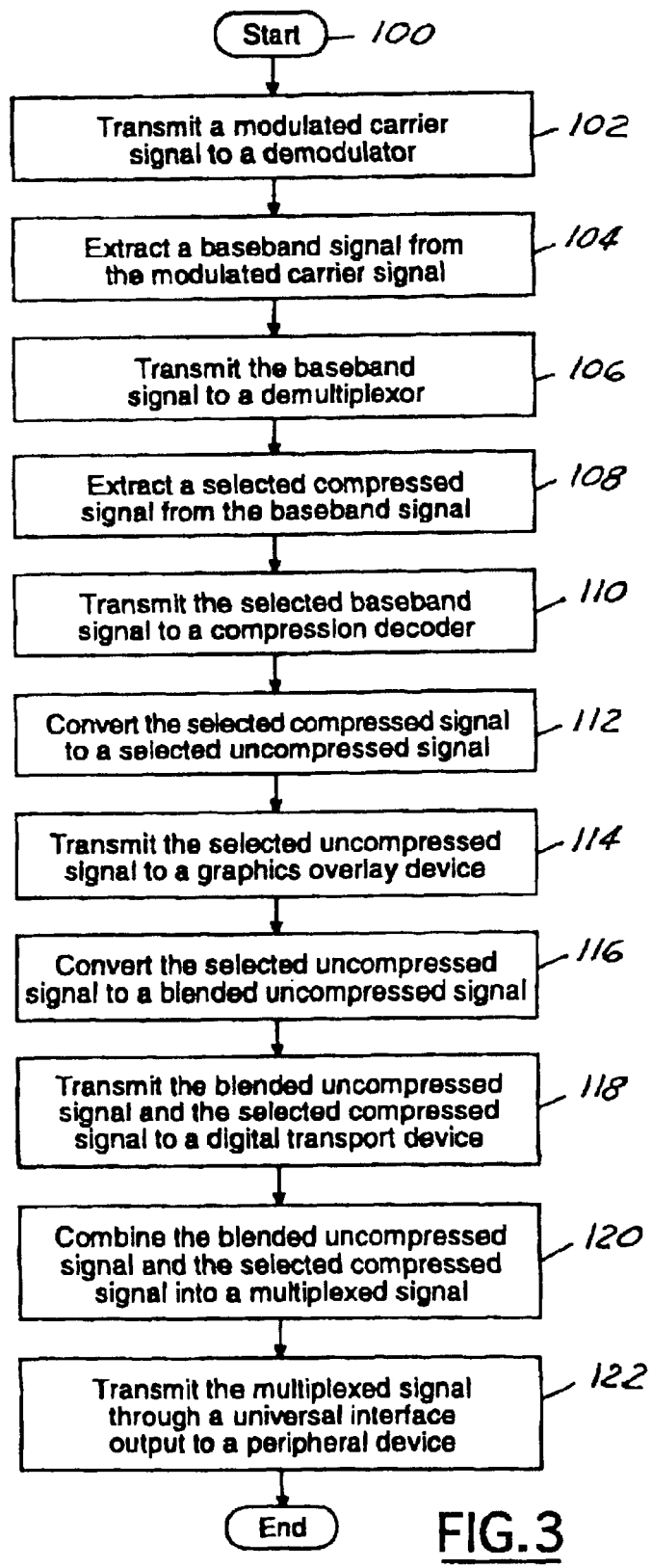
FIG. 3 is a flowchart illustrating a method of simultaneously transmitting compressed and uncompressed audio/video signals, in accordance with a preferred embodiment of the present invention.

Referring now to FIG. 3, there is shown a flowchart for a method of simultaneously transmitting compressed and uncompressed audio/video signals, in accordance with a preferred embodiment of the present invention. The method commences at step 100 and proceeds to step 102.

In step 102, a modulated carrier signal 14 is transmitted to a demodulator 36. As is known in the art, this transmission may be accomplished by a satellite, cable, terrestrial, or other suitable connection. The sequence then proceeds to step 104.

In step 104, the demodulator 36 extracts a baseband signal 38 from the modulated carrier signal 14. Typically, the baseband signal 38 has a narrower bandwidth than the modulated carrier signal 14. Then, the sequence proceeds to step 106.

In step 106, the baseband signal 38 is transmitted to a demultiplexor 40. Immediately thereafter, the sequence proceeds to step 108.

In step 108, the demultiplexor 40 separates the baseband signal 38 into several separate signals or channels and extracts a selected compressed signal 42 from those signals. Each signal comprises data for individual audio/video programs and other data services provided by the broadcast center 16. The selected compressed signal 42, 42' correlates to the audio/video program or data service chosen by the user. For example, the selected compressed signal 42, 42' may be for a particular channel chosen by a user watching television.

In an alternative embodiment, step 108 further includes the decryption of the selected compressed signal 42, 42'. This step may be accomplished by utilizing a de-scrambler 44 integrated within the demultiplexor 40. As known by one skilled in the art, decryption can be beneficial for a broadcast center 16 for providing only particular subscribers with access to a particular channel, e.g. pay-TV services. However, it is understood that decryption may be useful in a variety of other situations. The sequence then proceeds to step 110.

In step 110, the selected compressed signal 42 is sent to a compression decoder 46. Immediately thereafter, the sequence proceeds to step 112.

In step 112, the compression decoder 46 converts the selected compressed signal 42 into a selected uncompressed signal 48. As is known in the art, decompression of the selected compressed signal 42 reconstructs the signal 42 such that it is closer to its original form. The sequence then proceeds to step 114.

In step 114, the selected uncompressed signal 48 is transmitted to a graphics overlay device 50 from the compression decoder 46. Then, the sequence immediately proceeds to step 116.

In step 116, the graphics overlay device 50 blends user interface graphics with the selected uncompressed signal 48 so as to produce a blended uncompressed signal 52. As mentioned above, these graphics may include menu configurations for a channel guide, a movie guide, a message center, a weather forecast, and a variety of other services. Then, the sequence proceeds to step 118.

In step 118, the blended uncompressed signal 52 is transmitted to a digital transport device 30 from the graphics overlay device 50. Also, the selected compressed signal 42 is transmitted to the digital transport device 30 from the demultiplexor 40. Then, the sequence immediately proceeds to step 120.

In step 120, the digital transport device combines the blended uncompressed signal 52 with the selected compressed signal 42 so as to form a multiplexed signal 26. In this regard, the multiplexed signal involves relatively large amounts of data. As a result, the digital transport device 30 preferably has a throughput speed of 1 Gbps for processing the multiplexed signal 26. Of course, the digital transport device 30 may have various other suitable throughput speeds. The sequence then proceeds to step 122.

In step 122, the multiplexed signal 26 is transmitted through at least one universal interface output 54 to either a display device 32 or a recording device 34. In this respect, the universal interface output 54 preferably connects to both display devices 32 and recording devices 34. The versatility of the universal interface output 54 allows for relatively uncomplicated set-up of systems having IRDs 24.

By way of the present invention, various formats of data are transmitted by a single digital transport device 30 through a single universal interface output 54.

While particular embodiments of the invention have been shown and described, numerous variations and alternate embodiments will occur to those skilled in the art. Accordingly, it is intended that the invention be limited only in terms of the appended claims.

What is claimed is:

1. An integrated receiver decoder comprising:
   a demodulator receiving a modulated carrier signal and extracting a baseband signal from said modulated carrier signal;
   a demultiplexor coupled to said demodulator and receiving said baseband signal therefrom, said demultiplexor extracting a selected compressed signal from said baseband signal;
   a compression decoder coupled to said demultiplexor and receiving said selected compressed signal therefrom, said compression decoder converting said selected compressed signal into a selected uncompressed signal;
   a graphics overlay device coupled to said compression decoder and said demultiplexor, said graphics overlay device receiving said selected uncompressed signal from said compression decoder, said graphics overlay device receiving said selected compressed signal from said demultiplexor, said graphics overlay device blending said selected compressed signal and said selected uncompressed signal with a plurality of user interface graphics; and
   a digital transport device coupled to said graphics overlay device, said digital transport device receiving said selected compressed signal and said selected uncompressed signal from said graphics overlay device, said digital transport device combining said selected uncompressed signal and said selected compressed signal into a multiplexed signal for transmission through a universal interface output.

2. The integrated receiver decoder of claim 1 wherein said selected compressed signal comprises a compressed audio signal, a compressed video signal, and a compressed data signal.

3. The integrated receiver decoder of claim 1 wherein said selected uncompressed signal comprises an uncompressed audio signal, an uncompressed video signal, and an uncompressed data signal.

4. The integrated receiver decoder of claim 1 wherein said compression decoder includes control logic for decompressing at least one of an MPEG-1 format, an MPEG-2 format, an MPEG-3 format, an MPEG-4 format, and an MP3 format.

5. The integrated receiver decoder of claim 1 wherein said demodulator is coupled to at least one of a satellite transmitter, a cable transmitter, and a terrestrial transmitter, said demodulator receiving said modulated carrier signal therefrom.

6. The integrated receiver decoder of claim 1 wherein said universal interface output is coupled to at least one of a display device and a recording device.

7. An integrated receiver decoder comprising:
   a demodulator receiving a modulated carrier signal and extracting a baseband signal from said modulated carrier signal;
   a demultiplexor coupled to said demodulator and receiving said baseband signal therefrom, said demultiplexor extracting a selected compressed signal from said baseband signal;

a compression decoder coupled to said demultiplexor and receiving said selected compressed signal therefrom, said compression decoder converting said selected compressed signal into a selected uncompressed signal;

a graphics overlay device coupled to said compression decoder and said demultiplexor, said graphics overlay device receiving said selected uncompressed signal from said compression decoder, said graphics overlay device receiving said selected compressed signal from said demultiplexor, said graphics overlay device blending said selected compressed signal and said selected uncompressed signal with a plurality of user interface graphics;

a digital transport device coupled to said graphics overlay device, said digital transport device receiving said selected compressed signal and said selected uncompressed signal from said graphics overlay device, said digital transport device combining said selected uncompressed signal and said selected compressed signal into a multiplexed signal for transmission through a universal interface output; and a de-scrambler operatively connected between said demodulator and said compression decoder, said de-scrambler for decrypting at least said selected uncompressed signal.

8. The integrated receiver decoder of claim 7 wherein said selected compressed signal comprises a compressed audio signal, a compressed video signal, and a compressed data signal.

9. The integrated receiver decoder of claim 7 wherein said selected uncompressed signal comprises an uncompressed audio signal, an uncompressed video signal, and an uncompressed data signal.

10. The integrated receiver decoder of claim 7 wherein said compression decoder includes control logic for decompressing at least one of an MPEG-1 format, an MPEG-2 format, an MPEG-3 format, an MPEG-4 format, and an MP3 format.

11. The integrated receiver decoder of claim 7 wherein said demodulator is coupled to at least one of a satellite transmitter, a cable transmitter, and a terrestrial transmitter, said demodulator receiving said modulated carrier signal therefrom.

12. The integrated receiver decoder of claim 7 wherein said universal interface output is coupled to at least one of a display device and a recording device.

13. A method for simultaneously transmitting compressed and uncompressed signals to a peripheral device, the method comprising:

extracting a baseband signal from a modulated carrier signal;

extracting a selected compressed signal from said baseband signal;

converting said selected compressed signal into a selected uncompressed signal;

converting said selected compressed signal and said selected uncompressed signal into a blended compressed signal and a blended uncompressed signal; and combining said blended compressed signal and said blended uncompressed signal into a multiplexed signal for transmission through a universal interface output.

14. The method of claim 13 further comprising:

transmitting said modulated carrier signal to a demodulator for said extracting said baseband signal from said modulated carrier signal;

transmitting said baseband signal to a demultiplexor for said extracting said selected compressed signal from said baseband signal;

transmitting said selected compressed signal to a compression decoder for said converting said selected compressed signal into said selected uncompressed signal;

transmitting said selected compressed signal and said selected uncompressed signal to a graphics overlay device for said blending said selected compressed signal and said selected uncompressed signal with a plurality of user interface graphics; and transmitting said selected compressed signal and said selected uncompressed signal to a digital transport device for said combining said selected compressed signal and said selected uncompressed signal into said multiplexed signal for transmission through said universal interface output.

15. The method of claim 13 further comprising:

de-scrambling said blended compressed signal and said blended uncompressed signal.

16. The method of claim 15 further comprising:

transmitting said blended compressed signal and said blended uncompressed signal to a de-scrambler for said de-scrambling said blended compressed signal and said blended uncompressed signal.

17. The method of claim 13 further comprising:

transmitting said multiplexed signal to at least one of a display device and a recording device.

18. The method of claim 17 wherein said display device processes said multiplexed signal and displays at least one audio/video program.

19. The method of claim 18 wherein said multiplexed signal includes a compressed audio signal, a compressed video signal, an uncompressed audio signal, and an uncompressed video signal.

20. The method of claim 15 wherein said compression decoder is at least one of an MPEG-1 format, an MPEG-2 format, an MPEG-3 format, an MPEG-4 format, and an MP3 format.

* * * * *